United States Patent [19]

French et al.

[11] 4,352,787
[45] * Oct. 5, 1982

[54] ULTRA-HARD PARTICLES OF CARBON PRODUCED BY REACTING METAL CARBIDE WITH NON-METAL HALIDE IN HOT MELT SYSTEM

[75] Inventors: Frederic A. French; Douglas A. French, both of Portola Valley, Calif.

[73] Assignee: TDC-Technology Development Corp., Canada

[*] Notice: The portion of the term of this patent subsequent to Jun. 23, 1998, has been disclaimed.

[21] Appl. No.: 275,655

[22] Filed: Jun. 22, 1981

Related U.S. Application Data

[63] Continuation-in-part of Ser. No. 92,485, Nov. 8, 1979, Pat. No. 4,275,050.

[51] Int. Cl.$^3$ .............................................. C01B 31/00
[52] U.S. Cl. ..................................... 423/445; 51/307; 423/446; 423/491; 423/493; 423/496; 423/497; 423/499; 423/505
[58] Field of Search ............... 423/445, 446, 496, 439, 423/440, 441

[56] References Cited

U.S. PATENT DOCUMENTS

| | | | |
|---|---|---|---|
| 681,096 | 8/1901 | Blackmore | 423/439 X |
| 2,729,689 | 1/1958 | Blanchard et al. | 423/439 X |
| 3,268,457 | 8/1966 | Giardini et al. | 423/446 X |
| 3,362,788 | 1/1968 | Lauer | 423/446 |
| 3,692,479 | 9/1972 | Meadows et al. | 423/440 |
| 3,711,595 | 1/1973 | Margrave et al. | 423/446 |
| 4,039,648 | 8/1977 | Haupin et al. | 423/496 |
| 4,228,142 | 10/1980 | Holcombe et al. | 423/445 X |
| 4,275,050 | 6/1981 | French et al. | 423/445 |

FOREIGN PATENT DOCUMENTS 1226231 3/1971 United Kingdom .

OTHER PUBLICATIONS

Hackh's Chemical Dictionary-pub. 1953 by Blakiston Co., N. Y., p. 10 "acetylide"; p. 166 carbide.

Primary Examiner—Helen M. McCarthy

[57] ABSTRACT

The production of ultra-hard particles composed substantially of carbon as the dominant element is taught. The ultra-hard particle comprises a covalently bonded lattice structure produced by reacting a carbide selected from the group consisting of acetylide carbides, interstitial carbides and metal carbides with a polyhalide selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$, $BX_3$, $C_6X_6$, $C_5X_5N$, $SX_2$ and $X_2$ wherein X and Y are different halogens selected from the group consisting of chlorine, bromine, iodine and fluorine, and wherein A is an integer from 0 to 4, A' is an integer from 0 to 6, and A" is an integer from 0 to 4, and wherein n is an integer from 0 to 4, n' is an integer from 0 to 6, and n" is an integer from 0 to 4, wherein A, A', A", n, n' or n" is the same integer in any particular member selected and wherein $n+A=4$, $n'+A'=6$ and $n''+A''=4$. The reaction is carried out in a hot melt system having substantially no solvency capability for carbon.

21 Claims, No Drawings

ULTRA-HARD PARTICLES OF CARBON PRODUCED BY REACTING METAL CARBIDE WITH NON-METAL HALIDE IN HOT MELT SYSTEM

RELATED APPLICATIONS

This application is a continuation-in-part of U.S. application Ser. No. 92,485, filed on Nov. 8, 1979 U.S. Pat. No. 4,275,050.

BACKGROUND OF THE INVENTION

Prior to applicants' invention described in U.S. application Ser. No. 92,485, numerous attempts were made to convert various forms of carbon, including graphite, into its diamond form or other ultra-hard carbonaceous forms at ambient conditions. None of these attempts has been adequately substantiated. A valid diamond synthesis was reported in 1955, but details were not revealed until 1959 (Nature 184:1094-8, 1959). At temperatures of 1200° to 2400° C. and pressures ranging from 55,000 to 100,000 atmospheres or more, carbon is converted into its diamond form in the presence of transition metals (chromium, manganese, iron, cobalt, nickel, ruthenium, rhodium, palladium, osmium, iridium and platinum) or tantalum. Higher pressures are required at higher temperatures.

Rather esoteric means were also investigated in the quest for a more convenient graphite to diamond conversion. As reported in Phys. Rev. Letters 7:367 (1961), it was taught that diamond might be obtained in less than a microsecond by the action of extremely high pressure explosive shock waves on graphite. In fact, diamonds were recovered from carbon subjected to an explosive shock and this process is now used commercially.

Epitaxial methods have also been reported where the decomposition of gases, such as methane, ethane and propane in contact with diamond powder was found to promote diamond growth. However, in performing epitaxial techniques, temperatures in the vicinity of 1300° K. and pressures on the order of $10^{-3}$ to $10^{-4}$ atmospheres were found to be required.

It is obvious that the prior techniques employed in the fabrication of synthetic diamonds and other ultra-hard carbonaceous materials are at best complicated and expensive to carry out. The maintenance of extremes in temperature and pressure requires enormous energy and sophisticated equipment, which detracts from the widespread commercialization of synthetic diamond fabrication.

The invention embraced in U.S. patent application Ser. No. 92,485 represented a marked improvement over prior art techniques in calling for the production of ultra-hard particles having covalently bonded lattice structures composed largely of carbon in a method whereby aluminum carbide ($Al_4C_3$) was reacted with a halocarbon in a hot melt system at near ambient conditions. This invention eliminated the need for operating at extremes in temperature and pressure, thus greatly reducing the complexity of the processing system.

Although the invention described and claimed in U.S. patent application Ser. No. 92,485 remains an important contribution and dramatic step forward in the production of ultra-hard particles, there were some drawbacks. For example, the invention is restricted to the use of aluminum carbide as an initial reactant. Care had to be exercised to insure that the starting aluminum carbide be free from impurities, such as free carbon or excessive free aluminum. If excess free carbon was present in the metal carbide, graphite nucleation was promoted, thus greatly diminishing the yield of ultra-hard carbonaceous particles. For this reason, it was found that aluminum carbide starting materials should ideally possess metal to carbon ratios very close to those indicated by the stoichiometric formulas, although stoichiometries with the metal to carbon ratio or the carbon to metal ratios slightly greater than theoretical values were found acceptable.

It is thus an object of the present invention to teach the fabrication of ultra-hard particles having covalently bonded lattice structures composed largely of carbon, while eliminating the drawbacks of the prior art.

It is yet another object of the present invention to produce such ultra-hard particles by employing an expanded group of reactants beyond the aluminum carbide starting material, as described in applicants' parent application.

It is yet another object of the present invention to teach the formation of ultra-hard particles having covalently bonded lattice structures which employ acetylide carbides, interstitial carbides and metal carbides as possible initial reactants in place of aluminum carbide of the parent application.

SUMMARY OF THE INVENTION

The present invention comprises the formation of ultra-hard particles having covalently bonded lattice structures composed largely of carbon and produced by reacting a carbide selected from the group consisting of acetylide carbides, interstitial carbides and metal carbides with a polyhalide selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$, $BX_3$, $C_6X_6$, $C_5X_5N$, $SX_2$ and $X_2$ wherein X and Y are different halogens selected from the group consisting of chlorine, bromine, iodine and fluorine, and wherein A is an integer from 0 to 4, A' is an integer from 0 to 6, and A'' is an integer from 0 to 4, and wherein n is an integer from 0 to 4, n' is an integer from 0 to 6, and n'' is an integer from 0 to 4, wherein A, A', A'', n, n' or n'' is the same integer in any particular member selected and wherein $n+A=4$, $n'+A'=6$ and $n''+A''=4$. The reaction is carried out in a hot melt system having substantially no solvency capability for carbon. The hot melt system comprises a molten solution of more than one metal halide wherein the metals are selected from the group consisting of Group I, Group II and Group III metals of the periodic table, and the halides are selected from the group consisting of chloride, bromide, iodide and fluoride. As in the reaction of aluminum carbide with various halogens and related halocompounds, care should be exercised to minimize or eliminate the presence of substances which would react parasitically with carbon or the reactants, such as oxygen and oxygenated compounds with oxidizing power. The reactions tend to produce very hard and strong, covalently bonded lattice structures under highly exothermic conditions at moderate temperatures. Broadly, useful temperatures range between approximately 20° C. to 700° C. for periods of 1/10 of a second to 24 hours and at pressures of 1/10 to 100 atmospheres.

The various reactions disclosed herein have been carried out in a hot melt system which has substantially no solvency capability for carbon while carrying out ice. The solution was then heated to a gentle boil for 30 minutes, cooled, filtered and washed with two 500 ml additions of 3% HCl and four 50 ml additions of water, followed by four 50 ml additions of acetone. The product was vacuum dried, resulting in approximately 2.4 grams of ultra-hard carbonaceous particles.

EXAMPLE 2

To the melt system as developed in Example 1 was added approximately 6.4 grams of ground $CaC_2$ at a temperature of approximately 265° C. under an argon flow of 0.03 cubic feet per hour. At approximately 270° C., $CCl_4$ additions were made at a rate of 1 ml every ten minutes. The product was washed and dried again, as was done in Example 1 forming approximately 2600 mg of ultra-hard carbonaceous particles according to the following equation:

$$2CaC_2 + CCl_4 \xrightarrow{\Delta} 2CaCl_2 + 5C \quad \text{(Equation 2)}$$

EXAMPLE 3

Approximately 176 grams of the melt prepared according to Example 1 was placed in a 2 liter, four neck flask under mechanical stirring. The melt was heated to approximately 225° C. with the addition of approximately 20 grams of $AlCl_3$. To this was added approximately 13.4 grams or 0.01 mole $Mn_{23}C_6$ under an argon blanket.

Gaseous $Cl_2$ was added at a rate of 30 cc per minute with a total addition of 5.4 liters. The product was then washed and dried, resulting in approximately 900 mg of ultra-hard carbonaceous material produced according to the following equation:

$$Mn_{23}C_6 + 23Cl_2 \xrightarrow{\Delta} 23MnCl_2 + 6C \quad \text{(Equation 3)}$$

EXAMPLE 4

To 88 grams of the melt system prepared according to Example 1 was added 26.6 grams of $AlCl_3$ under argon. While maintaining a temperature of about 255° C., approximately 3.8 grams of ground $Li_2C_2$ was added again under argon. At a temperature of approximately 250° C., $CBr_4$ was added in 1 gram of additions, totaling 18 grams, while allowing the temperature to slip to approximately 220° C. at the final addition. The product was washed and dried according to the method disclosed in Example 1, resulting in approximately 4 grams of ultra-hard product produced according to the following equation:

$$2Li_2C_2 + CBr_4 \xrightarrow{\Delta} 4LiBr + 5C \quad \text{(Equation 4)}$$

EXAMPLE 5

A melt system was prepared by adding approximately 65.8 grams of LiCl to approximately 134.2 grams of RbCl in a 2 liter, four neck flask heated to 180° C. under argon with mechanical stirring for four hours. At a temperature of approximately 360° C., approximately 7.6 grams of $Li_2C_2$ was added followed by 1 ml additions of $CCl_4$ every ten minutes to a total of 15 additions under an argon blanket while maintaining the temperature between approximately 400°–425° C. The product was washed and dried according to the procedure as disclosed in Example 1, resulting in the formation of ultra-hard carbonaceous particles.

EXAMPLE 6

To 184 grams of a melt system composed of LiCl:$AlCl_3$ prepared as in Example 1 was added approximately 87 grams of $AlCl_3$ in a 2 liter, four neck flask with mechanical stirring under argon. To this was added approximately 20 mg of diamond powder followed by approximately 7.6 grams of ground $Li_2C_2$. This was followed by 1 ml additions of $CCl_3F$ every 20 minutes for a total of 12 additions. The solution was allowed to stand overnight and was then reheated, forming an ultra-hard carbonaceous product which was washed and dried according to Example 1. The product was produced according to the following reaction producing approximately 8 grams of product.

$$2Li_2C_2 + CCl_3F \xrightarrow{\Delta} LiF + 3LiCl + 5C \quad \text{(Equation 5)}$$

EXAMPLE 7

A melt system was formed by adding approximately 42.4 grams of LiCl to a flask and heating the compound to 180° for approximately 3 hours. After standing overnight, with mechanical stirring under argon, approximately 133 grams of $AlCl_3$ was added. At approximately 256° C., approximately 7.9 grams of $Fe_3C$ was added together with approximately 20 mg of 10 percent FeS in NaCl. A second reactant, namely, $CCl_4$ was added together with 1 gram of $CBr_4$. Further $CCl_4$ additions were made at a rate of 1 ml every 20 minutes for a total of 10 additions. The ultra-hard carbonaceous particles produced were washed and dried as in Example 1 yielding the final product according to the following reaction:

$$2Fe_3C + 3CCl_4 \xrightarrow{\Delta} 6FeCl_2 + 5C \quad \text{(Equation 6)}$$

EXAMPLE 8

A melt system was prepared by adding 133 grams of $AlCl_3$ to approximately 42.4 grams of LiCl which had previously been heated to 180° in a 4 liter flask. Approximately 6.5 grams of $LaC_2$ was then added to the melt followed by 1 ml additions of $CCl_4$ every 20 minutes for a total of 7 additions, noting that the final temperature was approximately 283° C. Approximately 0.8 g of ultra-hard carbonaceous product was produced according to the following reaction:

$$2LaC_2 + CCl_4 \xrightarrow{\Delta} 2LaCl_2 + 5C \quad \text{(Equation 7)}$$

EXAMPLE 9

A melt system was produced similar to that disclosed in Example 1 by heating approximately 21 grams of LiCl in a flask at 180° for three hours to which was added 80 grams of $AlCl_3$ under argon. At a temperature of approximately 280° C., approximately 3.3 grams of $CeC_2$ was added followed by 0.5 ml additions of $CCl_4$ every 20 minutes, totaling six additions. The ultra-hard carbonaceous particles were washed and dried as in Example 1 producing the final product according to the following reaction:

$$2CeC_2 + CCl_4 \xrightarrow{\Delta} 2CeCl_2 + 5C \quad \text{(Equation 8)}$$

EXAMPLE 10

A hot melt system was prepared as in the previous example to which approximately 4.4 grams of $SrC_2$ was added at approximately 280° C. This was then followed by the addition of $CCl_4$ in 0.5 ml amounts for five additions. The ultra-hard carbonaceous particles were washed and dried as in Example 1 producing the final product according to the following reaction:

$$2SrC_2 + CCl_4 \xrightarrow{\Delta} 2SrCl_2 + 5C \quad \text{(Equation 9)}$$

EXAMPLE 11

A melt system was formed by introducing approximately 42.4 grams of LiCl into a 2 liter flask, which was in turn heated to 180° for three hours. The melt stood for two days under a full vacuum after which time approximately 160 grams of $AlCl_3$ was added under argon with mechanical stirring.

After the melt was formed, the temperature was maintained at approximately 250° at which time approximately 14.7 grams of $BaC_2$ was added followed by 1 ml additions of $CCl_4$ to a total of ten additions. The ultra-hard carbonaceous particles were then washed and dried as in Example 1 producing the final product according to the following reaction:

$$2BaC_2 + CCl_4 \xrightarrow{\Delta} 2BaCl_2 + 5C \quad \text{(Equation 10)}$$

EXAMPLE 12

A melt system was formed by introducing 42.4 grams of LiCl in a 2 liter flask and maintaining the flask and its contents at approximately 180° C. for three hours. After maintaining a vacuum overnight, approximately 133.5 grams of $AlCl_3$ was added under argon with mechanical stirring.

While maintaining a temperature of approximately 235°, approximately 15.6 grams of $Mn_{23}C_6$ was added followed by 21 one ml additions of $CCl_4$. The ultra-hard carbonaceous particles were washed and dried as in Example 1 producing the final product according to the following reaction:

$$2Mn_{23}C_6 + 23CCl_4 \xrightarrow{\Delta} 46MnCl_2 + 35C \quad \text{(Equation 11)}$$

EXAMPLE 13

To 12 grams of LiCl which was dried in an oven overnight was added 67 grams of $AlCl_3$ under argon. The mixture was heated at a sufficient temperature for one hour to form a liquid melt after which time two 1.4 gram additions were made of powdered $Li_3N$. Subsequently, 20 grams of $CBr_4$ was added in 2 gram portions every five minutes while heating was continued. After an hour, the ultra-hard carbonaceous particles were washed and dried as in Example 1 producing the final product according to the following reaction:

$$4Li_3N + 3CBr_4 \xrightarrow{\Delta} 12LiBr + C_3N_4 \quad \text{(Equation 12)}$$

EXAMPLE 14

A melt system was prepared as in the previous example to which approximately 7.2 grams of $Fe_3C$ and 20 mg of 10 percent FeS in NaCl were added; the latter ingredients being added as a catalyst. 20 grams of $CBr_4$ was then added in 2 gram additions every five minutes, while heating was continued for an additional 15 minutes. The ultra-hard carbonaceous particles were washed and dried as in Example 1 producing approximately 1.5 grams of final product according to the following reaction:

$$2Fe_3C + 3CBr_4 \xrightarrow{\Delta} 5C + 6FeBr_2 \quad \text{(Equation 13)}$$

EXAMPLE 15

A melt system was formed by drying 20 grams of LiCl overnight after which 30 grams of $AlCl_3$ was added under an argon blanket with sufficient heat to form a melt. Approximately 4.6 grams of coarsely powdered $Mn_3C$ was added to the melt followed by six 1 ml additions of $CCl_4$ at 20 minute intervals. The solution was heated for an additional 25 minutes and the ultra-hard carbonaceous particles were then washed and dried as in Example 1 producing approximately 0.15 g of final product according to the following reaction:

$$2Mn_3C + 3CCl_4 \xrightarrow{\Delta} 6MnCl_2 + 5C \quad \text{(Equation 14)}$$

EXAMPLE 16

To 16 grams dried LiCl was added 67 grams of $AlCl_3$ and the mixture heated to approximately 230° C. for 1.5 hours. To this was added approximately 2.9 grams of $Al_4C_3$ and 20 mg of 10% FeS in NaCl. The mixture was heated for approximately 1 hour at about 230° C. and was capped and allowed to stand overnight. After heating at 230° C. for about ½ hour, 7 ml of $SCl_2$ was added in 1 ml portions at 5 minute intervals and the melt held at 230° C. for about an hour. The product was washed and dried according to the procedure disclosed in Example 1 resulting in the formation of approximately 2.2 grams of ultra-hard particles according to the following equation:

$$Al_4C_3 + 6SCl_2 \xrightarrow{\Delta} 4AlCl_3 + 3C + 6S \quad \text{(Equation 15)}$$

This product was further refined by heating it at a gentle boil with toluene. After such treatment, the yield was reduced from approximately 2.2 grams to approximately 1 gram.

As the above examples demonstrate, ultra-hard carbonaceous particles can be produced as the product of a reaction of a carbide selected from the group consisting of acetylide carbides, interstitial carbides and metal carbides with the polyhalides selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$, $BX_3$, $C_6X_6$, $C_5X_5N$, $SX_2$ and $X_2$ wherein X and Y are different halogens selected from the group consisting of chlorine, bromine, iodine and fluorine, and wherein A is an integer from 0 to 4, A' is an integer from 0 to 6, and A" is an integer from 0 to 4, and wherein n is an integer from 0 to 4, n' is an integer from 0 to 6, and n" is an integer from 0 to 4, wherein A, A', A", n, n' or n" is the same integer in any particular member selected and wherein $n+A=4$, $n'+A'=6$ and $n''+A''=4$, said reaction being carried out in the hot melt system having substantially no solvency capability for carbon comprising a molten solution of more than one metal halide wherein the metals are selected from the group consisting of Group I, Group II and Group III metals of the periodic table, and the halides are selected from the group consisting of chlorine, bromine, iodine and fluorine. In actual reactions which were carried out, the reaction energy was found to be enormously favorable and more than 100 times as great per carbon atom as the graphite-carbon interconversion energy. The need for extremes in either temperature or pressure, conditions which were employed by synthetic diamond and other hard carbonaceous particle fabricators, have been completely eliminated in practicing the present invention.

The present invention also contemplates the use of nucleating agents with lattice constants close to that of diamond. For example, very fine particles of FeS, Cu, or diamond itself may be employed. The present invention also contemplates the use of a catalyst such as $I_2$.

Particles produced according to the present invention were routinely tested for hardness and corresponding abrasiveness. A one-inch by 0.090 inch optically finished sapphire disc was glued to a one-inch by three inch glass microscope slide. One mg of each product was placed on the center of the sapphire disc and moistened with a drop of isopropanol. The surface was rubbed with a convex face of a plano-convex lens for five minutes. About half way through the isopropanol had evaporated. The slide was then washed, dried and the entire sapphire surface examined at 100 and 400 power magnification using a differential interference microscope with epi-illumination.

The following scale is established based on examination of the entire sapphire surface:
0—No visible scratches
1—A few scratches (less than 10)
2—A moderate number of scratches (10 to 500)
3—Many scratches (more than 500)
4—Heavily scratched (frosted with very little bare surface visible).

The above-recited scale is roughly logarithmic. That is, the numbers 0 to 4 are approximately exponents of 10 with the number of scratches as $10^n$. It was noted that natural diamond having a particle size equal to or less than 0.5 microns had a rating of 3+, while diamond in the size range between 1 to 5 microns had a rating of 4. The ultra-hard carbonaceous particles as claimed herein and as produced in the above-recited examples routinely yield uniform scratches on the sapphire surface with a length to depth ratio on the order of $10^4$ or better. The vast majority of products yield scratch test ratings of 3+.

Typically, the materials prepared in the practice of the present invention have been in the form of fine particles in the micron and sub-micron ranges. In suitable size fraction ranges, they are useful as polishing agents for ultra-hard materials. In fact, they might be considered much more effective polishing agents than either natural or synthetic macrocrystalline diamond due to the absence of extended cleavage planes.

Similarly, the products of the present invention can become part of various wear-resistant surfaces and can also, due to their reactive surface atoms or groups, such as halogens or carbon-carbon multiple bonds, react with monomers, partial monomers and reactive polymers to yield thermoplastic or thermoset materials with unusual physical properties.

What is claimed is:

1. Ultra-hard particles having covalently bonded lattice structures composed largely of carbon and produced by reacting a carbide selected from the group consisting of acetylide carbides, interstitial carbides and other metal carbides with a halide or halogen reactant selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$, $BX_3$, $C_6X_6$, $C_5X_5N$, $SX_2$ and $X_2$ wherein X and Y are different halogens selected from the group consisting of chlorine, bromine, iodine and fluorine, and wherein A is an integer from 0 to 4, A' is an integer from 0 to 6 and A" is an integer from 0 to 4, and wherein n is an integer from 0 to 4, n' is an integer from 0 to 6 and n" is an integer from 0 to 4, wherein A, A', A", n, n' or n" is the same integer in any particular member selected and wherein $n+A=4$, $n'+A'=6$ and $n''+A''=4$, said reaction being carried out in a hot melt system having substantially no solvency capability for carbon comprising a molten solution of more than one metal halide wherein the metals are selected from the group consisting of Group I, Group II and Group III metals of the periodic table and the halides are selected from the group consisting of chlorine, bromine, iodine and fluorine, said reaction being carried out at temperature and pressure conditions sufficient to maintain the melt system in the liquid state.

2. The ultra-hard particles of claim 1 wherein the carbide is an acetylide carbide in which the metal is selected from the group consisting of group IA, IIA, IB, IIB and IIIB and lanthanides.

3. The ultra-hard particles of claim 2 wherein the metal is lithium.

4. The ultra-hard particles of claim 1 wherein the hot melt system comprises $LiAlCl_4$.

5. The ultra-hard particles of claim 2 wherein the metal is calcium.

6. The ultra-hard particles of claim 2 wherein the metal is strontium.

7. The ultra-hard particles of claim 2 wherein the metal is barium.

8. The ultra-hard particles of claim 2 wherein the metal is lanthanum.

9. The ultra-hard particles of claim 2 wherein the metal is cerium.

10. The ultra-hard particles of claim 1 wherein the halide reactant is $CCl_4$.

11. The ultra-hard particles of claim 1 wherein the halide reactant is $CBr_4$.

12. The ultra-hard particles of claim 1 wherein the halide reactant is $CI_4$.

13. The ultra-hard particles of claim 1 wherein the interstitial carbide is $Mn_3C$.

14. The ultra-hard particles of claim 1 wherein the interstitial carbide is $Fe_3C$.

15. The ultra-hard particles of claim 1 wherein the interstitial carbide is $Co_3C$.

16. The ultra-hard particles of claim 1 wherein the interstitial carbide is $Mn_{23}C_6$.

17. The ultra-hard particles of claim 1 wherein the halide reactant is $CCl_3F$.

18. The ultra-hard particles of claim 1 wherein the halide reactant is $C_2Cl_6$.

19. The ultra-hard particles of claim 1 wherein the carbide is aluminum carbide and the halide reactant is a member selected from the group consisting of $BX_3$ and $SX_2$ wherein X is a halogen selected from the group consisting of chlorine, bromine, iodine and fluorine.

20. The ultra-hard particles of claim 19 wherein the halide reactant is $BBr_3$.

21. The ultra-hard particles of claim 19 wherein the halide reactant is $SCl_2$.

* * * * *